United States Patent [19]

Handschuher

[11] Patent Number: 4,819,557
[45] Date of Patent: Apr. 11, 1989

[54] FLEXIBLY COUPLED ROLLER CHAIN FOR THREADING A SUBSTRATE WEB IN A ROTARY WEB PRINTING MACHINE

[75] Inventor: Walter Handschuher, Königsbrunn, Fed. Rep. of Germany

[73] Assignee: Man Roland Druckmaschinen AG, Offenbach am Main, Fed. Rep. of Germany

[21] Appl. No.: 218,806

[22] Filed: Jul. 13, 1988

[30] Foreign Application Priority Data

Aug. 3, 1987 [DE] Fed. Rep. of Germany ....... 3725634

[51] Int. Cl.⁴ ...................... B41F 13/54; B65H 20/00
[52] U.S. Cl. ...................................... 101/228; 226/92
[58] Field of Search ............... 101/226, 228, 225, 219, 101/181; 226/92, 91

[56] References Cited

U.S. PATENT DOCUMENTS

| | | | |
|---|---|---|---|
| 2,944,345 | 7/1960 | Faeber | 101/228 |
| 3,587,461 | 6/1971 | Polglase | 226/92 |
| 3,761,001 | 9/1973 | Bolza-Schunemann et al. | 226/92 |
| 3,995,553 | 12/1976 | Winterholler et al. | 101/228 |
| 4,187,968 | 2/1980 | Winterholler et al. | 226/92 |
| 4,370,927 | 2/1983 | Fischer | 101/228 |
| 4,404,907 | 9/1983 | Kobler et al. | 101/228 |
| 4,480,801 | 11/1984 | Stone | 101/228 |
| 4,706,862 | 11/1987 | Theilacker | 101/228 X |
| 4,958,850 | 7/1986 | Winterholler et al. | 101/228 |

FOREIGN PATENT DOCUMENTS

| | | | |
|---|---|---|---|
| 38450 | 10/1981 | European Pat. Off. | 101/228 |
| 116402 | 3/1900 | Fed. Rep. of Germany | |
| 2241127 | 3/1974 | Fed. Rep. of Germany | |
| 2519662 | 4/1975 | Fed. Rep. of Germany | 101/228 |
| 3048797 | 7/1982 | Fed. Rep. of Germany | |
| 405845 | 1/1910 | France | |
| 76368 | 4/1986 | Japan | 101/228 |
| 2076377 | 12/1981 | United Kingdom | 101/228 |

Primary Examiner—Eugene H. Eickholt
Attorney, Agent, or Firm—Frishauf, Holtz, Goodman & Woodward

[57] ABSTRACT

To permit a threading roller chain for a printing machine to flex outside of a plane, for example parallel to the printing machine, and permit passage of the threading mechanism about turning bars and the like, the roller chain is formed of a plurality of bolt elements (1, 16) retaining rollers (2, 19) thereon, and rotatable within the guide track (15, 29). The bolt elements (1, 16) are connected by flexible, preferably steel cables or ropes (4, 5, 22), passed through holes (11, 23) in the bolts and retained therein by pinch or clamp deformation of the bolts. The cables or ropes accept tension forces between adjacent bolts and rollers. To accept compression forces, essentially non-compressible spacer elements (6, 24) are placed between adjacent bolts, preferably in form of tightly wound spiral springs, surrounding the respective cables or ropes. The cables or ropes, with the spacers thereabout, can be passed alongside a single roller (FIGS. 1, 2) or centrally through the bolts and between a pair of rollers located on the bolts (FIGS. 5, 6).

16 Claims, 2 Drawing Sheets

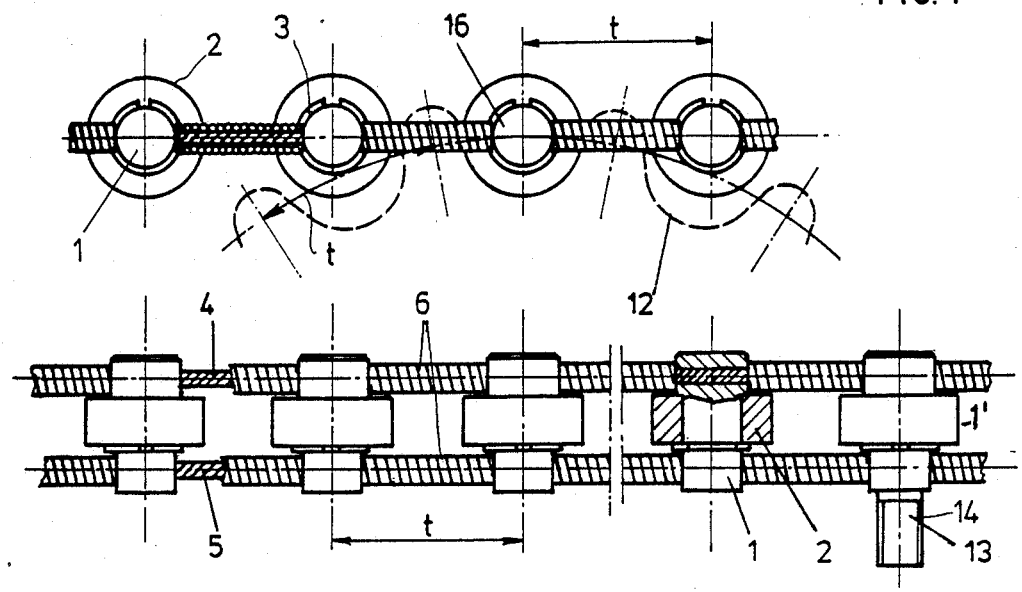
FIG.1
FIG.2
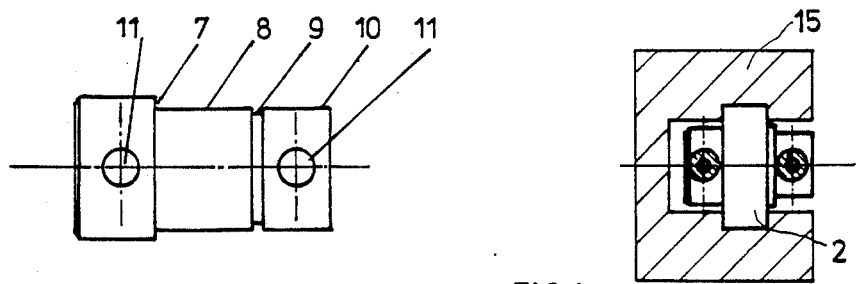
FIG.3
FIG.4

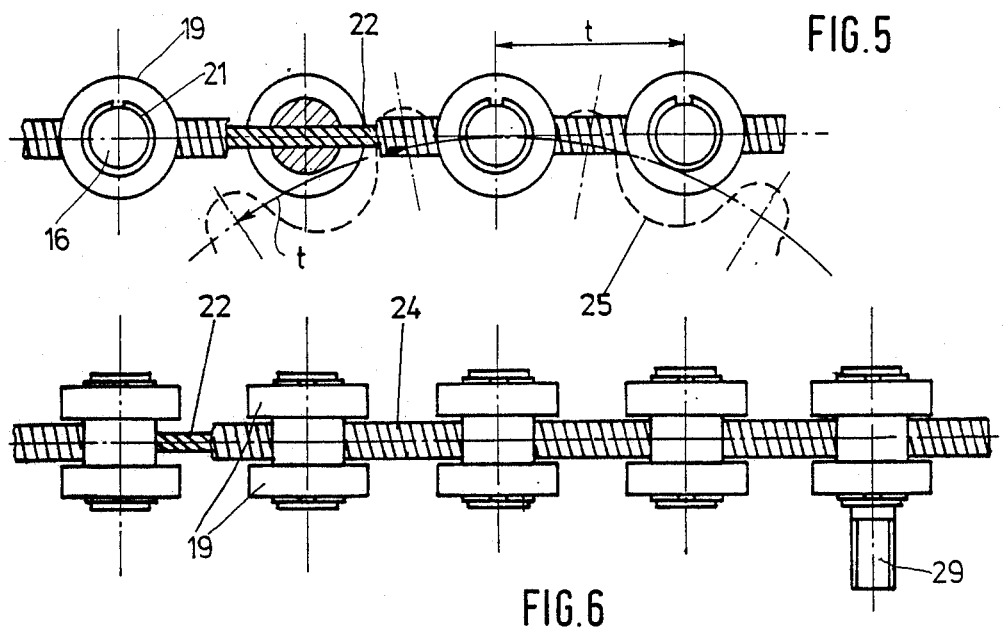
FIG.5
FIG.6
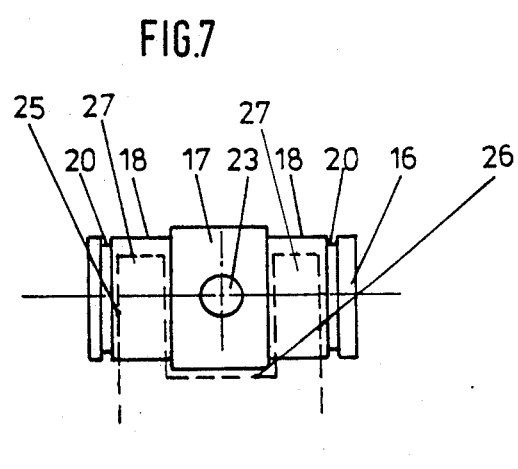
FIG.7
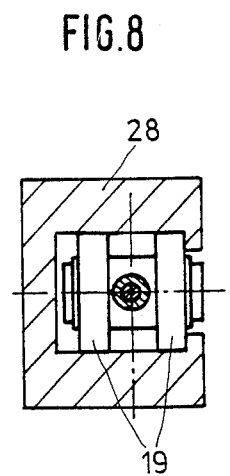
FIG.8

FLEXIBLY COUPLED ROLLER CHAIN FOR THREADING A SUBSTRATE WEB IN A ROTARY WEB PRINTING MACHINE

Reference to related patents, assigned to the assignee of the present application, and the disclosure of which are hereby incorporated by reference:
U.S. Pat. No. 3,995,553, Winterholler et al
U.S. Pat. No. 4,187,968, Winterholler et al
U.S. Pat. No. 4,370,927, Fischer
U.S. Pat. No. 4,404,907, Kobler and Winterholler
U.S. Pat. No. 4,706,862, Theilacker.
Reference to related disclosure: German Pat. No. 22 41 127.

The present invention relates to printing machinery, and more particularly to a roller chain located along a side wall of a printing machine and arranged for pulling a web substrate, typically a paper web, through the printing machine along a guide path.

BACKGROUND

It is known to provide a threading arrangement for rotary printing machines, in which a roller chain or the like is coupled to the web by a coupling element, the roller chain being then guided along a guide path. U.S. Pat. No. 3,995,553, Winterholler et al, as well as U.S. Pat. No. 4,404,907, Kobler and Winterholler, both assigned to the assignee of the present application and the disclosure of which is hereby incorporated by reference, describe further details. Typically, the threading element is a roller chain in which rotatable roller elements are located on cross bolts, the cross bolts being connected together by connecting links. The links are relatively stiff, and thus permit bending of the roller chain only in one plane. The roller chain or chain elements is moved by engagement with suitably controlled and operated sprockets (see also German Pat. No. 22 31 127).

THE INVENTION

It is an object to provide a printing machine with an improved paper threading apparatus utilizing a roller chain, and more particularly to a roller chain which is capable of being bent not only in one plane but, generally, in space.

Briefly, the respective cross bolts and rollers located thereon are interconnected by a flexible connection of the bolt elements which transfers both tension as well as compression forces between adjacent bolt elements and the rollers thereon, to thereby permit movement of adjacent bolt elements with respect to each other in space. The flexible connection is formed by a cable, rope or the like which connects adjacent bolt elements and which provides for transfer of tension forces, and, further, with flexible, essentially non-compressible spacers positioned between the adjacent bolt elements to transfer compression forces therebetween. In accordance with a preferred feature of the invention, the cable is passed through diametrical openings in the bolts and can be retained in the bolts by pinch deformation of the bolts in the region of the openings; the incompressible spacer elements are, preferably, spiral spring elements which can be threaded over the cable or rope in the region between adjacent spacers. The incompressible spacer elements remain loose on the rope or cable.

The arrangement, thus, permits dividing the forces which are transferred by the links of a conventional roller chain into tensile forces to be accepted by the flexible cable and rope and compressive forces, by the also flexible spacer elements. This arrangement, thus, provides a flexible threading cable which can be bent not only about a plane extending transversely to the bolt elements but, additionally, can accept bending in space perpendicularly to said plane, thus being capable of accepting a guide path which is not located in a single plane only, and, thereby, permits placement of the guide path about turning rods or bars for the paper web to be threaded, for example.

Drawings, showing illustrative embodiments:

FIG. 1 is a schematic side view of the flexible roller chain, partly in section;

FIG. 2 is a top view, also partly in section, of the chain of FIG. 1;

FIG. 3 is an enlarged detail view of a bolt element with the roller removed;

FIG. 4 illustrates placement of the chain of FIGS. 1 and 2 within a guide element on, or attached to a printing machine, for example;

FIG. 5 is a view similar to FIG. 1, and illustrating another embodiment;

FIG. 6 is a view similar to FIG. 2, and illustrating another embodiment;

FIG. 7 is a schematic side view of a bolt element, with the rollers removed, and illustrating in broken lines the engagement region of a sprocket wheel; and FIG. 8 illustrates the roller chain of FIGS. 5 and 6 in a guide track formed on or being part of a printing machine, in which the guide track is shown in cross-sectional view.

DETAILED DESCRIPTION

The roller chain is formed of connecting elements and engagement elements. FIGS. 1 and 2 illustrate a plurality of engagement and connecting elements of the roller chain to form part of a paper or substrate web threading arrangement for a rotary printing machine. Each engagement element includes a bolt 1 on which a roller 2 is centrally rotatably retained. The roller 2 is retained between a flange 7 (FIG. 3) of one end portion of the bolt 1 and a retaining ring 16 (FIG. 1) snapped into a groove 9 (FIG. 3) of the bolt.

In accordance with the invention, adjacent bolts 1 are connected by flexible cables or ropes 4,5 to accept tensile forces between the adjacent bolts and by spacer elements 6. The spacer elements are hollow and the ropes or cables 4, 5 are threaded through the spacer elements.

FIG. 3 illustrates bolt 1 to an enlarged scale. It has a bearing surface 8 for the roller 2, a flange surface 7 forming one axial limit stop for the roller 2 and a groove 9 to receive the retention ring 3, for example a C snap ring. An end portion 10 projects beyond the groove 9. The flange portion 7 as well as the end portion 10 is formed with diametrically extending holes 11. The holes 11 are so dimensioned that the ropes or cables 4, 5 can be passed therethrough. The spacer elements 6 are, preferably, spiral springs, wound so as to form a tightly wound block or cylindrical structure, that is, essentially without clearance gaps between individual windings of the spacer springs. The spacer springs retain the bolts 1 and the rollers 2 thereon by a spacing which corresponds to the pitch spacing t of the elements of the roller chain, and which, also, corresponds to the pitch of a sprocket wheel 12 (FIG. 1). The sprocket wheel 12, and which may be part of the printing machine or located thereon, is shown in broken lines since it does not form part of the present invention.

To make the chain, the ropes or cables 4, 5, after having the spacers 6 threaded thereon, are then threaded through the bolts 1. When the entire chain has been made, by subsequent threading of the bolts 1 through the cables and spacer elements 6 assembled thereover, the bolts 1 can be deformed in the region of the openings 11, by pinch deformation or compression deformation, to thus retain the bolts on the cables or ropes 4, 5. Thus, the cables or ropes 4, 5 will transmit tensile forces between adjacent bolt elements; upon compression being applied, the non-compressible spacer elements 6 transfer compressive forces between adjacent bolts 1.

Selected ones of the bolts have an axial extension 13 formed thereon, as shown at bolt 1' in FIG. 2. The axial extension 13 has a thread 14 thereon, used to attach a holder for the web to be threaded, such as a hook or a threading triangle, see for example, U.S. Pat. No. 4,706,862, assigned to the assignee of the present application, and the disclosure of which is hereby incorporated by reference.

The printing machine, for example as shown in the referenced U.S. Pat. Nos. 3,995,553 or 4,404,907, includes a guide track 15 (FIG. 4) thereon. The guide track 15 is an essentially channel-shaped structure with internal clearance so dimensioned that the rollers 2 can easily run in a track formed therein, while providing for lateral guidance of the rollers 2. The channel structure 15 is formed with an open slit to permit the extension 13 (FIG. 2) of the bolts 1' to pass therethrough, and for pulling the web through the printing machine. The channel 15 is formed with cut-outs at suitable intervals, for example on the lower side of the channel structure, to permit engagement therethrough of the sprocket 12.

EMBODIMENT OF FIGS. 5-7

The bolts 16 are coupled together by a rope or cable 22 and spacer elements 24 passing centrally through the bolts 16. The bolts 16 have a central portion 17 of increased diameter, located adjacent two running surfaces 18 (see FIG. 4) for two rollers 19. The rollers 19 are retained in position by C rings or other arrangements snapped into ring grooves 20. Snap rings 21 are shown in FIG. 5. The bolts 16 are coupled by the rope 22 extending through diametrical openings 23. As before, the central portion 17 of the bolts can be deformed after the cable or rope 22 is passed therethrough to pinch or clamp or compress the rope in the hole 23. The respective rollers 19 on the bolts 16 are spaced from each other by spacer elements 24, which also accept compressive forces. The spacer elements 24, again, and preferably, are formed as tightly wound spiral spring elements.

The sprocket wheel 25, shown in broken lines in FIGS. 5 and 7, has axially parallel teeth 27, separated by a groove or cut-in region 26 (FIG. 7), so that the teeth 27, when engaged with the chain, laterally pass around the spacer elements 24. Rather than using a single sprocket wheel 25, two narrow sprockets can be used, spaced from each other by a spacer ring, the distance between the narrow sprockets as defined by the width of the spacer ring being just slightly greater than the outer diameter of a spacer element 24. The arrangement of FIG. 5 is desirably used in connection with printing machines which require substantial deviation from a single running plane, since the web threading chain of FIGS. 5 and 6 can be bent out of the longitudinal plane of the chain, extending transversely to the plane of the drawing of FIG. 6, more readily than the chain illustrated in FIGS. 1 and 2.

FIG. 8 illustrates the guide track, forming the guide path for the chain of FIG. 2. The guide track 28, again, is an essentially channel-shaped structure with a slit along one side. The inner spacing of the channel-shaped structure, which is slightly bent inwardly at the outer edge adjacent the slit to retain the chain therein, is so dimensioned that the rollers 19 can readily roll off within the channel, while being laterally guided. The slit permits passage therethrough of the extension portion 29 (FIG. 6) which carries the threading hook and such associated apparatus as is desirable, to thread a substrate web through the printing machine. The channel 28 is slit, at suitable intervals, to permit engagement of the sprocket 25 with the chain.

The ropes or cables 4, 5, 22 preferably are flexible steel ropes or cables. The spacer elements 6, 24, due to tight winding, transfer compressive forces. The tightness of the winding will to some extent determine the lateral flexibility of the roller chain. The respective bolts 1, 1', 16 of the engagement elements are coupled by the deformation of the bolts in the region where the cables or ropes 4, 5, 22 pass through the respective openings.

Various changes and modifications may be made and any features described herein may be used with any others, within the scope of the inventive concept.

I claim:

1. Web threading roller chain for threading a paper web into a printing machine along a predetermined guide path having a plurality of bolt elements (16);

roller means (19) rotatably supported on the bolt elements for rotation thereabout, flexible cable means (22) connected to and coupling together adjacent bolt elements (1, 16) for transfer of tension forces therebetween, and spacer elements (24) surrounding the cable means and positioned between the adjacent bolt elements, wherein each bolt element (16) carries two roller means (19) axially spaced from each other;

the flexible cable means (22) and the spacer elements (24) are located axially between said roller means;

wherein the bolt elements (16) are each formed with an essentially diametrical through-bore (23), the flexible cable means (22) extending through said through-bore; and wherein said bolt elements are deformed in the region of the through-bores to pinch or clamp the bolt elements (16) on the flexible cable means (22).

2. The chain of claim 1, wherein the spacer elements (24) comprise essentially cylindrical, hollow structures through which the flexible cable means (22) are guided.

3. The chain of claim 1, wherein the flexible cable means comprise a flexible steel rope or cable.

4. The chain of claim 1, wherein the spacer elements (24) comprise spiral spring elements having a hollow interior.

5. The chain of claim 4, wherein the spiral spring elements are tightly wound spiral springs, and the flexible cable means (22) comprises cables or ropes located within the hollow interior of the spiral springs.

6. The chain of claim 5, wherein the flexible cable means comprise a flexible steel rope or cable.

7. The chain of claim 1, wherein the spacer elements (24) are essentially non-compressible cylindrical hollow structures.

8. The chain of claim 1, wherein the flexible spacer elements (24) are located loose on said flexible cable means between the adjacent bolt elements.

9. The combination of a printing machine having a guide track (28) for threading a substrate web into the printing machine along a predetermined guide path with a web threading roller chain retained in said track, said roller chain having a plurality of bolt elements (16);

roller means (19) rotatably supported on the bolt elements for rotation thereabout and received within said guide track, and spacer elements (24) surrounding the cable means and positioned between the adjacent bolt elements, wherein each bolt element (16) carries two roller means (19) axially spaced from each other;

the flexible cable means (22) and the spacer elements (24) are located axially between said roller means;

wherein the bolt elements (16) are each formed with an essentially diametrical through-bore (23), the flexible cable means (22) extending through said through-bore; and wherein said bolt elements are deformed in the region of the through-bores to pinch or clamp the bolt elements (16) on the flexible cable means (22).

10. Combination of claim 9, wherein the spacer elements (24) comprise essentially cylindrical, hollow structures through which the flexible cable means (22) are guided.

11. Combination of claim 9, wherein the flexible cable means comprise a flexible steel rope or cable.

12. Combination of claim 9, wherein the spacer elements (24) comprise spiral spring elements having a hollow interior.

13. Combination of claim 12, wherein the spiral spring elements are tightly wound spiral springs, and the flexible cable means (22) comprising cables or ropes located within the hollow interior of the spiral springs.

14. Combination of claim 13, wherein the flexible cable means comprise a flexible steel rope or cable.

15. Combination of claim 9, wherein the spacer elements (24) are essentially non-compressible cylindrical hollow structures.

16. Combination of claim 9, wherein the flexible spacer elements (24) are located loose on said flexible cable means between the adjacent bolt elements.

* * * * *